(12) United States Patent
Kim

(10) Patent No.: US 7,099,392 B2
(45) Date of Patent: Aug. 29, 2006

(54) MOTION VECTOR SEARCHING METHOD USING PLURAL SEARCH AREAS

(75) Inventor: Sung Deuk Kim, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 374 days.

(21) Appl. No.: 10/138,560

(22) Filed: May 6, 2002

(65) Prior Publication Data

US 2002/0172287 A1    Nov. 21, 2002

(30) Foreign Application Priority Data

May 7, 2001    (KR) ............................. 2001-24675

(51) Int. Cl.
*H04B 1/66* (2006.01)
(52) U.S. Cl. ..................... 375/240.16; 375/240.12; 375/240.26; 348/699; 382/236; 382/238
(58) Field of Classification Search ........... 375/240.16, 375/240.12, 240.26; 348/699; 382/236, 382/238
See application file for complete search history.

(56) References Cited

U.S. PATENT DOCUMENTS 5,557,341 A * 9/1996 Weiss et al. ................ 348/699
5,742,710 A * 4/1998 Hsu et al. .................. 382/236
6,081,553 A * 6/2000 Kitson et al. ............... 375/240

* cited by examiner

*Primary Examiner*—Shawn S. An
(74) *Attorney, Agent, or Firm*—Fleshner & Kim, LLP

(57) ABSTRACT

A motion vector searching system and method estimates a motion vector during image compression by acquiring a present image frame and at least one previous image frame, generating low-resolution images of the present and previous frames in multiple stages, determining areas in one of the stages in which pixel searches are to be performed, locating at least two areas which overlap, and then merging the overlapping areas if a merge condition is satisfied. The search areas are determined by identifying candidate points in the low-resolution image which have low pixel absolute difference values, and the merge condition may correspond to a certain minimum distance between centers of the overlapping areas. A motion vector estimator is used to perform additional searching in the merged and non-merged areas to generate a motion vector associated with the present and previous image frames. Through at least the merging step, the motion vector searching system and method are able to achieve improved performance in terms of computational efficiency.

9 Claims, 5 Drawing Sheets

FIG.5

| size of search area | merging condition |
|---|---|
| ±1 | Distance(A,B) ≤ 2 |
| ±2 | Distance(A,B) ≤ 4 |
| ±3 | Distance(A,B) ≤ 5 |
| ±4 | Distance(A,B) ≤ 7 |

MOTION VECTOR SEARCHING METHOD USING PLURAL SEARCH AREAS

BACKGROUND OF THE INVENTION

1. Field of the Invention

The present invention relates generally to image compression, and more particularly to a motion vector searching method using plural search areas.

2. Background of the Related Art

Generally, the core technique of multimedia is to compress information such as an image, sound, voice, text, general data, etc., in accordance with characteristics of the respective information. If the information is not compressed, it is difficult to transmit or store the information due to its excessive amount of data.

In compressing the image, the compression ratio can be heightened by allowing errors to go uncorrected that a human eye or ear can hardly perceive. Information compressed in this manner may be somewhat different from the original values during its restoration, but it does not matter if the difference is not detected by the human eye or ear.

Image compression is performed through removal of duplication imminent in the image data. The duplication imminent in the image data is briefly classified into three kinds. First, pictures of two adjacent frames are very similar to each other in the event that several frames are produced per second, and backgrounds of the pictures are the same except for a portion where motion exists. This is a temporal duplication existing between the pictures. Also, values of adjacent pixels in the picture are very similar to each other, and this is a spatial duplication existing between the pixels. The remaining one is a statistical duplication.

Generally, a motion vector search is used as an element that influences the performance of a moving image compressor. In case of performing a full area search, an extremely large amount of computations is consumed. Thus, diverse methods for high-speed motion searching have been introduced, and a motion searching section has been implemented by hardware.

As shown in FIG. 1, the core element of any motion estimation section has typical inputs and outputs irrespective of the hardware implementation, software implementation, and high-speed searching method.

A motion estimator of FIG. 1 receives pixel values (i.e., original data) $O(k,l)$ of the present frame, pixel values $P(k,l)$ of the previous frame restored from the compression, ranges of search areas $(M0,N0)$ and $(M1,N1)$, and block size (BS) as its inputs, determines a motion vector between the present frame and the previous frame and sum of absolute difference (SAD) among the search areas according to the relationship among the inputs, and outputs determined values.

The core of the motion vector search is to search the most similar area to a search area of the present frame from the previous frame, and can be expressed by the following Equation 1.

$$SAD(i, j) = \sum_{k=0}^{BS-1} \sum_{l=0}^{BS-1} |O(k, l) - P(k + i, l + j)| \quad \text{[Equation 1]}$$

$$MV = \underset{(i,j)}{\mathrm{argmin}}(SAD(i, j)), \, M0 \le i \le M1, \, N0 \le j \le N1$$

In Equation 1, the sum of absolute difference—(SAD) denotes a degree of similarity that is an index for measuring the similarity among the areas, and BS denotes the size of the block. $(M0,N0)$ and $(M1,N1)$ denote a tetragonal search area in the restored previous frame. Specifically, $(M0,N0)$ denotes a left upper coordinate in the tetragonal search area, and $(M1,N1)$ denotes a right lower coordinate in the tetragonal search area. Also, $O(k,l)$ denotes pixel values of the present frame to be searched, and $P(k,l)$ denotes pixel values of the restored previous frame.

Equation 1 is used for searching a motion vector from the pixel values $O(k,l)$ of the present frame, the pixel values $P(k,l)$ of the restored previous frame, and in the tetragonal ranges of the search areas $(M0,N0)$ and $(M1,N1)$.

The sum of absolute difference (SAD) that is an index for measuring the similarity among the areas is obtained as follows.

First, the pixel value $P(k,l)$ of the restored previous frame is subtracted from the pixel value $O(k,l)$ of the present frame to be searched using the search area ranges $(M0,N0)$ and $(M1,N1)$. This subtraction is performed with respect to all the pixels. Then, absolute values of the subtracted values are obtained, respectively, and then added together. The added value is the sum of absolute difference (SAD).

Thereafter, $(i,j)$ corresponding to a minimum SAD value among the SAD values obtained with respect to the respective $(i,j)$ is determined as the motion vector (MV) of the present frame. For example, it is assumed that the block size (BS) is 16, the left upper coordinate of the search area is $(M0,N0)=(-16,-16)$, and the right lower coordinate of the search area is $(M1,N1)=(15,15)$.

If an image having a firstly given resolution is supplied to the motion vector estimator 10 on the basis of the original point $(0,0)$, a full motion vector search with respect to a macro block of MPEG-4 or H.263 begins. The full search has a good performance, but has a too much amount of computation.

SUMMARY OF THE INVENTION

An object of the invention is to solve at least the above problems and/or disadvantages and to provide at least the advantages described hereinafter.

Another object of the present invention is to provide a motion vector searching method using plural search areas that substantially obviates one or more problems due to limitations and disadvantages of the related art.

Another object of the present invention is to provide a method of estimating a motion vector with a small amount of computations.

Another object of the present invention is to provide a motion vector estimating method that can improve the motion estimation performance by merging a plurality of independent search areas that overlap one another and match a merging condition into a tetragon of a minimum size, and reduce the amount of computation according to the reduction of the number of searched points.

To achieve at least the above objects and other advantages in a whole or in part and in accordance with the purpose of the invention, as embodied and broadly described herein, a motion vector searching method comprising: computing degrees to which a plurality of search areas overlap during motion vector estimation between a present frame and a previous frame using the plural search areas; judging whether the overlapping degrees computed among the search areas satisfy a merging condition; if the overlapping degrees satisfy the merging condition in the judging step, merging corresponding overlapping search areas; and estimating a motion vector using the merged search areas.

Preferably, the overlapping degrees are distances among the respective search areas, and the distances are obtained from coordinate values of center points of the respective search areas.

Preferably, the center point of a specified search area is set to (0,0), and then the distance between the center point and a relative remaining search area is obtained from the center point. Otherwise, the center point of the specified search area is set to median value or a left side value of the motion vector of adjacent blocks, and then the distance between the center point and the relative remaining search area is obtained from the center point.

Preferably, the center points are the predetermined number of points having a relatively small SAD in the frames having a resolution lower than the present frame and the previous frame, and the SAD is sum of absolute differences among the pixel values of the respective search areas of the present frame and the previous frames. Specifically, it is obtained from the predetermined number of points having a small SAD in the frames having the lowest resolution from the present frame and the previous frame through a full search.

Preferably, the distance is obtained through subtraction of the coordinates of the center points of the respective search areas, and obtaining of the sum of absolute values of the subtracted values.

Preferably, a threshold value of the merging condition is determined in proportion to the size of the plural search areas.

To further achieve the above objects in a whole or in part and in accordance with the purpose of the invention, as embodied and broadly described herein, a motion vector searching method using plural search areas comprising: lowering resolutions of a present frame to be searched and at least one previous frame by plural stages; determining a predetermined number of candidate points in the present frame and the previous frame having the resolution of a certain stage by a search; judging whether overlapping degrees among the search areas centering around the determined candidate points satisfy a merging condition; if the overlapping degrees satisfy the merging condition in the judging step, merging the corresponding search areas; and estimating a motion vector using merged search areas.

Preferably, at the merging step, the merger is sequentially performed from at least two adjacent search areas that satisfy the merging condition.

Preferably, at the merging step, at least two search areas randomly selected among the search areas that satisfy the merging condition are first merged, and the merger is sequentially performed.

To further achieve the above objects in a whole or in part and in accordance with the purpose of the invention, as embodied and broadly described herein, a motion vector searching method, comprising: lowering resolutions of a present frame to be searched and at least one previous frame by plural stages; determining a predetermined number of candidate points in the present frame and the previous frame having the resolution of a certain stage by a search; judging whether overlapping degrees among the search areas centering around at least one of the determined candidate points and the number of search points satisfy a merging condition; if the at least one of the overlapping degrees and the number of search points satisfy the merging condition in the judging step, merging the corresponding search areas; and estimating a motion vector using merged search areas.

To further achieve the above objects in a whole or in part and in accordance with the purpose of the invention, as embodied and broadly described herein, a method for generating a motion vector between image frames using a motion vector estimator, comprising: acquiring a present image frame and a previous image frame having a first resolution; generating a lower-resolution image from the present frame and a lower-resolution image from the previous frame; identifying a predetermined number of search candidate points in the lower-resolution image of the present frame and the lower-resolution image of the previous frame; searching areas surrounding respective ones of the search candidate points in the present frame and the previous frame having the first resolution, the searching step including locating respective ones of the areas which overlap; merging the overlapping areas if a predetermined merge condition is satisfied; and estimating a motion vector based on said merged areas.

To further achieve the above objects in a whole or in part and in accordance with the purpose of the invention, as embodied and broadly described herein, an image processing system, comprising: a unit for acquiring a present image frame and a previous image frame having a first resolution; a unit for generating a lower-resolution image from the present frame and a lower-resolution image from the previous frame; a unit for identifying a predetermined number of search candidate points in the lower-resolution image of the present frame and the lower-resolution image of the previous frame; a unit for searching areas surrounding respective ones of the search candidate points in the present frame and the previous frame having the first resolution, the searching step including locating respective ones of the areas which overlap; a unit for merging the overlapping areas if a predetermined merge condition is satisfied; and an estimation unit which estimates a motion vector based on the merged areas.

It is to be understood that both the foregoing general description and the following detailed description of the present invention are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a table illustrating merging rule according to a size of a search area according to an embodiment of the present invention.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 2:
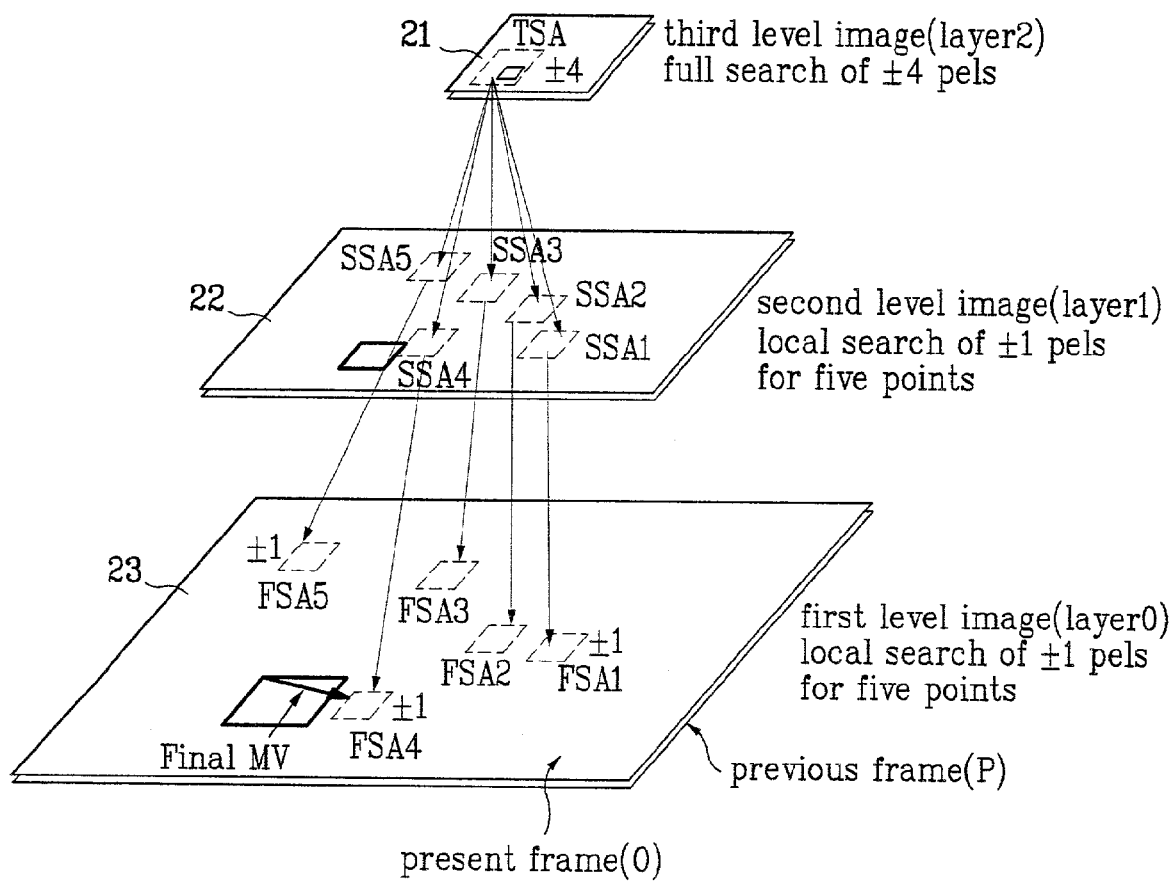
FIG. 2 is a conceptual view illustrating an exemplary hierarchical motion vector searching method using multiple candidates.

FIG. 2 is a conceptual view explaining a hierarchical motion vector searching method using multiple candidates used in accordance with one embodiment of the present invention.

For the hierarchical motion vector search, resolution of an input present frame and a previous frame restored from compression is lowered by stages. At this time, in order to lower the resolution, sub-sampling or filtering is preferably used. Several motion vector candidates are determined for the motion vector search between the present frame and the previous frame having the resolution of a certain stage. The determination of the motion vector candidates is called a local motion vector search. This local motion vector search may be performed by at least one stage. However, in accordance with a preferred embodiment of the present invention, the local motion vector search is performed by two stages to provide a better effect.

The motion vector candidates are coordinate points having a relatively small SAD–, and will be center points (or initial points or the like) of the search areas for the motion vector search among the frames having the resolution higher than the certain stage. The number of coordinate points is properly adjusted according to the resolutions of the present frame and the previous frames where the coordinate points are determined. The sum of absolute difference (SAD) is obtained by Equation 1.

As shown in FIG. 2, the previous frame and the present frame have three layers of resolution. Layer-2, Layer-1, and Layer-0 are exemplified. First, five motion vector candidate points SSA1~SSA5 are determined in the lowest resolution (i.e., third-level image). Then, the candidate points are used as the center points of the search areas for the motion vector search between the frames having a higher resolution (i.e., second-level image). When the SAD between the present frame and the previous frame is obtained using the equation 1, the above candidate points will be the coordinate points having a relatively small SAD comparing to other coordinate points.

There may be many methods for determining initial points for search in frames having lower resolutions. In the lower layer search, five candidate points may be determined in the order of generating the smallest SAD. Also, the resultant value of search (i.e., left side value or median value of the adjacent block) obtained through the local motion vector search among frames having lower resolutions, may be determined as the initial points for search among frames having higher resolutions.

Figure 1:
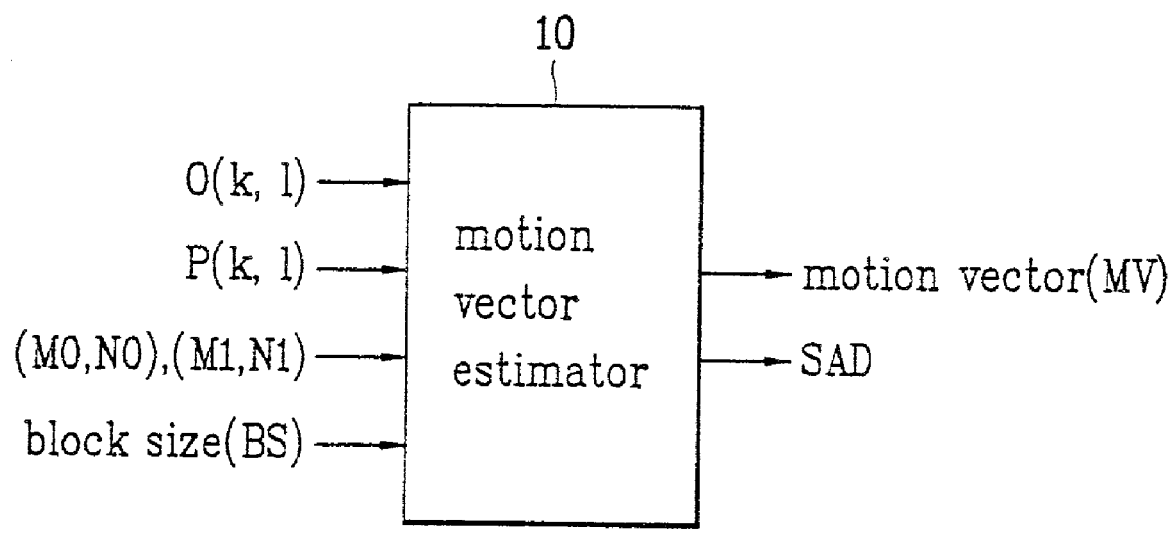
FIG. 1 is a view illustrating a motion estimator using multiple candidates.

The hierarchical search illustrated in FIG. 2 will be explained in accordance with the inputs/outputs of the motion vector estimator of FIG. 1.

First, the motion vector estimator 10 receives as its input an image reduced to ¼ in length and breadth, respectively (i.e., full search of ±4 pels) corresponding to the layer-2 (i.e., third-level image), and determines proper search area and size. Then, the motion vector estimator 10 searches the present frame and the restored previous frames using the search area of the determined size, and then uses a proper candidate as an initial point for search of the layer-1 (i.e., second-level image) 22 based on the search result. Then, the motion vector estimator 10 performs the respective local searches centering around five initial points for local search (i.e., ±1 pel for five points) in the layer-1 22. On the layer-1 22, the input image is the image reduced to ½ in length and breadth, respectively. The motion vector estimator 10 determines the final motion vector by searching the neighborhood of five points on the layer-0 (i.e., first-level image) 23 that corresponds to the search result on the layer-1.

In this case, the search areas may overlap one another centering around the search candidate points. For instance, if the five candidate values provided from the layer-2 21 to the layer-1 present almost similar points in FIG. 2, the search areas with respect to five points on the layer-1 22 may greatly overlap. For this, preferred embodiments of the present invention can use the method as shown in FIG. 3.

Figure 3:
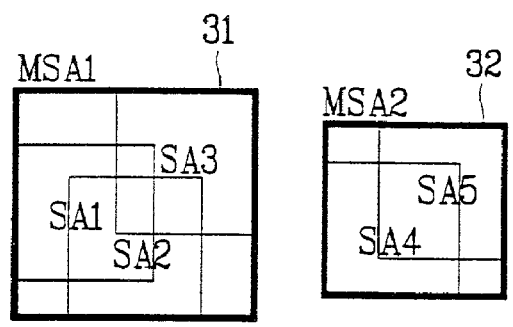
FIG. 3 is a view illustrating a motion vector searching process using merger of a plurality of search areas according to an embodiment of the present invention.
Figure 4:
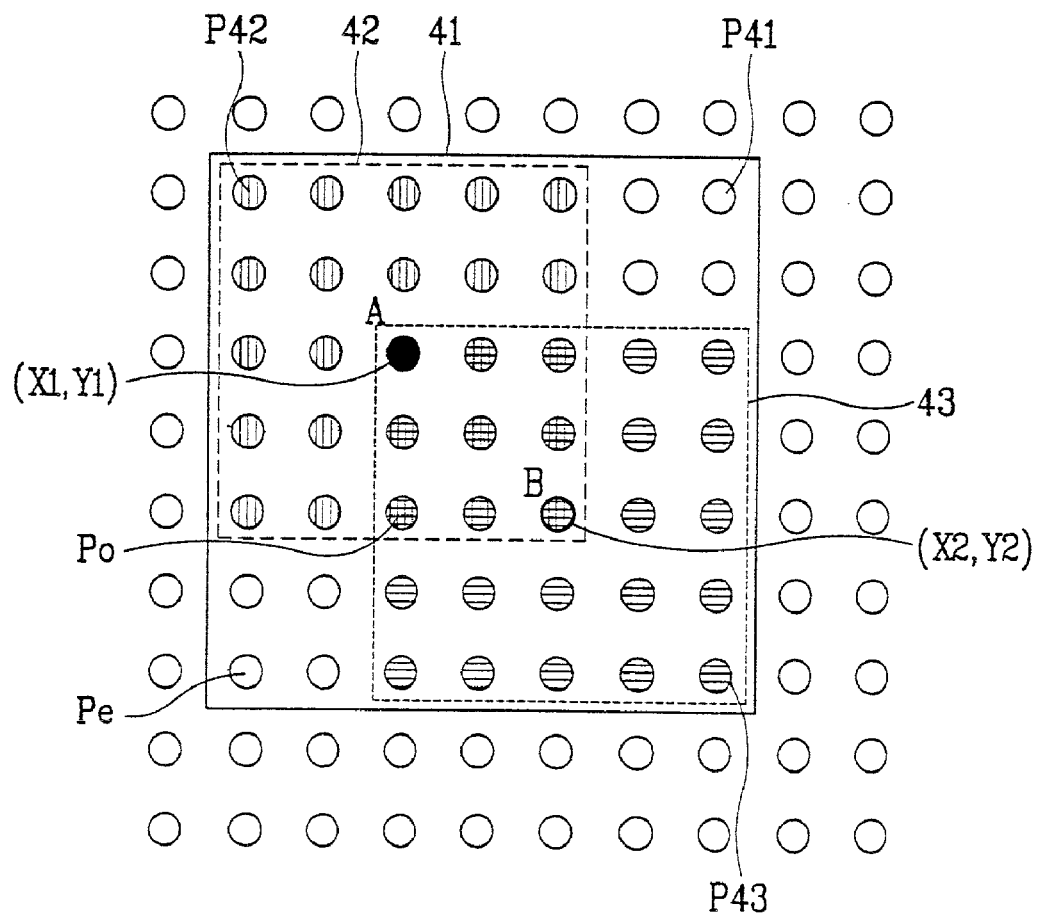
FIG. 4 is a view illustrating search area merging process in case that two search areas exist according to an embodiment of the present invention.

FIG. 3 is a view illustrating a motion vector searching process using the merger of a plurality of search areas according to an embodiment of the present invention. FIG. 4 is a view describing a search area merging process in case that two search areas exist according to an embodiment of the present invention, and FIG. 5 is a table describing a merging rule according to a size of a search area according to an embodiment of the present invention.

In FIG. 3, it is assumed that five search candidate points are obtained on the layer-2. However, the present invention is not intended to be so limited. Thus, it is assumed that a local motion vector search begins using the search areas on which the five search candidate points are centered on the layer-1. As shown, five independent search areas (SA1,SA2, SA3,SA4,SA5) are merged into two large merged search areas (MSA1,MSA2) respectively labeled 31 and 32. Since the search areas SA1, SA2, and SA3 have overlapping areas, the motion vector estimator 10 searches a motion vector with respect to a first merged search area-1 (MSA1) 31, and with respect to a second merged search area-2 (MSA2) 32. At this time, the motion vector estimator 10 produces a merged search area in which several search areas overlap one another and which has a tetragon of a minimum size if the merging condition is satisfied. Consequently, although the case that the actual number of search points is reduced through merger is considered to be ideal, the merger can be performed even in case that several search areas overlap one another and match the merging condition.

FIG. 4 is a view showing the search area merging process in case that two search areas exist. It is assumed that only two search areas are used on a certain layer in this case.

In FIG. 4, the center points (or initial points) of the two search areas 42 and 43 may result from the lower resolution, or may be estimated values such as (0,0) or median values of the adjacent blocks (it is assumed that its size is the same as that of the search area).

It is assumed that the center points of the two search areas 42 and 43 are A and B, the size of the two search areas is ±2(−2,−1,0,+1,+2) in length and breadth, respectively, and coordinate values of A and B are (X1,Y1) and (X2,Y2), respectively. Since the number of search points P42 of the first search area 42 is 25 and the number of search points P43 of the second search area 43 is 25, the sum of the respective numbers of the search points belonging to the two search areas 42 and 43 is 50 (=25+25). However, though the actual number of search points is 41 (=P42+P43−Po) (=50−9) due to the points (Po=9) that exist in the overlapping areas, 50 search points can be searched.

If the merged search area 41 resulting from the merger of the two search areas is used, the number of search points is 49 (i.e., P41=7*7). The number of search points of the merged search area 41 is substantially decreased compared to the sum of the number of search points of the two search areas. The present invention therefore improves performance by reducing the amount of computations involved through a removal of duplicate search areas.

Now, the judging condition of the merged search area will be considered. First, the distance between the two search areas is defined. Here, the one-dimensional distance is given by the following Equation 2.

Equation 2

$$Distance(A,B)=|X1-X2|+|Y1-Y2|$$

In Equation 2, when the distance between the two search areas is less than a threshold value (i.e., DISTANCE(A,B) $\leq$ THR), the two search areas are merged. Specifically, the distance between the two search areas corresponds to the distance obtained by subtracting vector coordinates (i.e., center point coordinates) of at least two different search areas with respect to the two axes, obtaining absolute values of the subtracted values, and then adding the absolute values. Here, the threshold value is determined in proportion to the sizes of the two search areas subject to comparison.

FIG. 4 illustrates the search of $\pm 2$ pels in length and breadth that is performed under the assumption that the search areas have the same width centering around the motion vector candidate point (i.e., reference point) obtained in the lower layer as shown in FIG. 2. In this case, the proper threshold value is 4.

FIG. 5 shows the respective proper preferred threshold values with respect to the case that the size of the search area is $\pm 1$, $\pm 2$, $\pm 3$, and $\pm 4$ pels, respectively. As shown in the merging condition of FIG. 5, by using search areas having diverse sizes and threshold values that are in proportion to the sizes, the number of search points of the merged search area that satisfy the judging condition of merger of the motion vector search areas becomes at least smaller than the total number of search points of the individual search areas.

Meanwhile, the center point of the two search areas in FIG. 4 may be obtained from a lower resolution as shown in FIG. 2, or may be estimated from the left side value or median value for the adjacent blocks in the same manner as the motion vector encoding of H.263 or MPEG-4. Especially, in case of using either A or B as the reference point (0,0), the distance (A,B) between the two search areas can be easily obtained. Also, the reference point (0,0) provides room for compression of the motion vector information of the corresponding block into one bit, and thus has an advantage in coding efficiency. Also, if the median value or left side value of the motion vector of the adjacent blocks is used as a candidate, the coding efficiency of the motion vector can be improved.

As described above, the use of the reference point (0,0) or the adjacent vector value greatly increases its coding effect through merger of the search areas. Although the merger reduces the amount of computation in comparison to that before the merger, it increases the actual number of merged search points since it includes search points newly added to corners of the merged area, that is, adjacent search points of the independent search areas.

Meanwhile, the merger may be performed with a preferred or an optimum merging condition judged considering the number of all possible cases, sequentially from the adjacent area in consideration of the computation amount, or sequentially from a certain selected search area.

The motion vector may be estimated by adaptively using the search for the independent areas that do not match the merging condition and the search for the merged search areas that match the merging condition during the hierarchical motion vector search. Specifically, since the merged search areas and the independent search areas that cannot be merged coexist during the motion vector estimation on a specified layer, the motion vector estimation can be performed by adaptively selecting the search areas, so that the whole amount of computation and the number of search points can be reduced.

Figure 6:
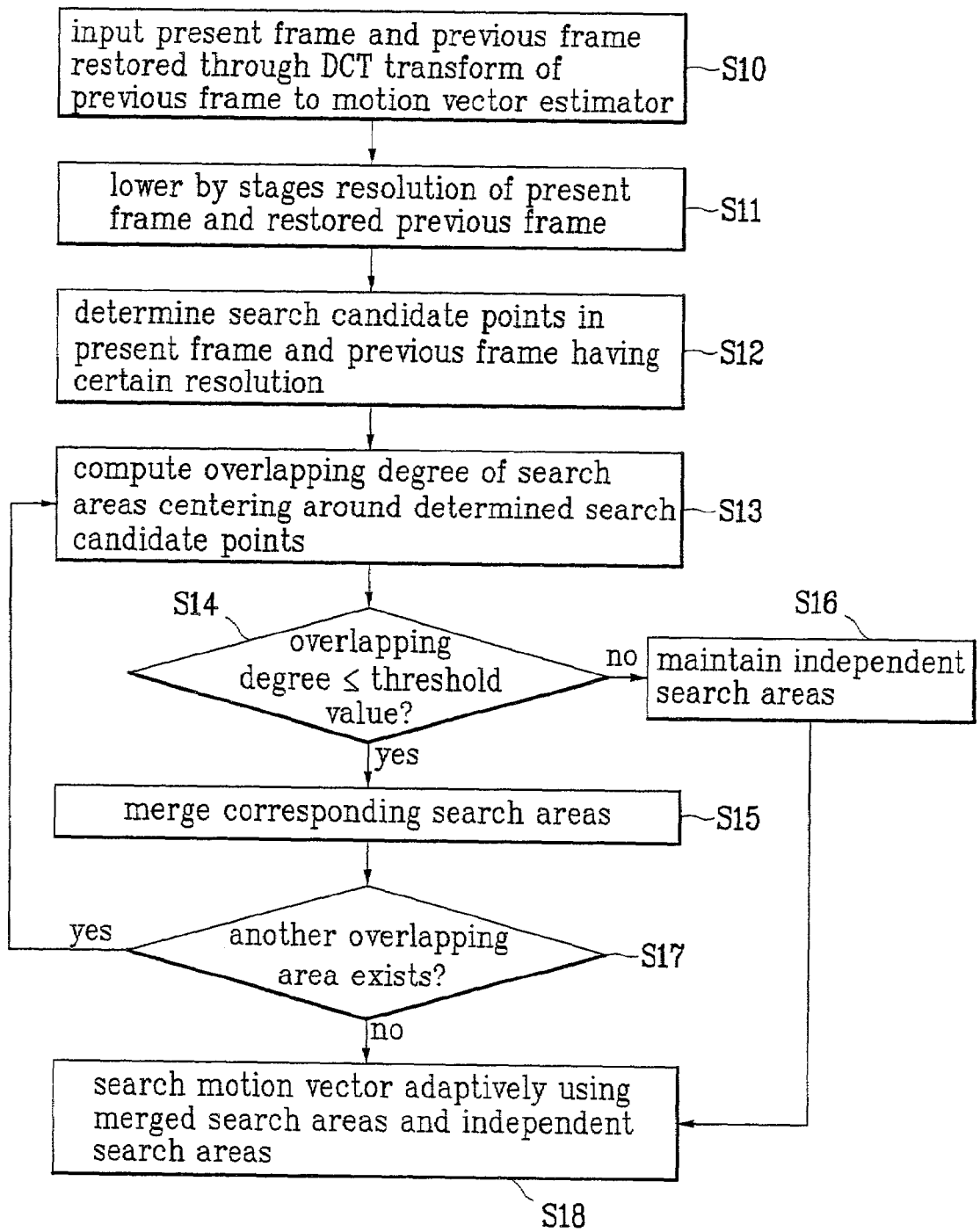
FIG. 6 is a view illustrating a motion vector searching procedure according to the present invention.

FIG. 6 is a view illustrating a motion vector searching procedure according to an embodiment of the present invention. Referring to FIG. 6, if the present frame and the previous frame restored through DCT transform of the previous frame are inputted to the motion vector estimator (step S10), the resolution of the present frame and the previous frame is preferably lowered by plural stages (step S11). Then, the search candidate points are determined from the present frame and the restored previous frame having a certain resolution (step S12). As previously described, the search candidate points have a small SAD through the full search in the present frame and the previous frames having the lowest resolution. The SAD as shown in the equation 1, is obtained by the sum of absolute differences of pixel values among the search areas of the present frame and the previous frames.

Then, the overlapping degree or overlapping amount among the search areas centering around the determined search candidate points is calculated (step S13), and it is judged whether the overlapping degree is equal to or smaller than the threshold value (step S14). If the overlapping degree is greater than the threshold value, the existing independent search areas are maintained as the corresponding search areas (step S16).

If it is judged that the overlapping degree is equal to or smaller than the threshold value, the corresponding search areas are merged (step S15). Then, a second judgment is performed to determine whether another merged area exists (step S17), and if so, the procedure after the step S13 is repeated. However, if it is judged that another merged area does not exist, the motion vector is searched adaptively using the merged search areas and the independent search areas (step S18).

As described above, according to the motion vector searching method using multiple candidates according to the present invention, the overlapping degree of the as independent search areas is judged, the independent search areas are merged into a minimum size, and a search of the merged area is performed. Thus, the duplicated computation of the overlapping search areas is eliminated, and the total amount of computation is reduced. Also, the motion vector is estimated in the search area in which the actual number of search points is increased in comparison to the number of search points of the individual search areas, and thus the motion estimation performance can be improved.

It will be apparent to those skilled in the art than various modifications and variations can be made in the present invention. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A motion vector searching method using a plurality of search areas, comprising:
   lowering resolutions of a present frame to be searched and at least one previous frame by a plurality of stages;
   determining a predetermined number of candidate points in the present frame and the previous frame having the resolution of a certain stage by a search;
   judging whether overlapping degrees among the plurality of search areas centering around the determined candidate points satisfy a merging condition;
   if the overlapping degrees satisfy the merging condition in said judging step, merging the corresponding search areas; and
   estimating a motion vector using the merged search areas.

2. The motion vector searching method of claim 1, wherein in the determining step, the candidate points having a small SAD are determined by a full search in the present frame and the previous frame having the lowest resolution.

3. The motion vector searching method of claim 2, wherein the SAD is a sum of absolute differences among the pixel values of the respective search areas of the present frame and the previous frame.

4. The motion vector searching method of claim 1, wherein in the merging step, the merger is sequentially performed from at least two adjacent search areas that satisfy the merging condition.

5. The motion vector searching method of claim 1, wherein in the merging step, at least two search areas randomly selected among the search areas that satisfy the merging condition are first merged, and then the merger is sequentially performed.

6. A motion vector searching method, comprising:
   lowering resolutions of a present frame to be searched and at least one previous frame by a plurality of stages;
   determining a predetermined number of candidate points in the present frame and the previous frame having the resolution of a certain stage by a search;
   judging whether overlapping degrees among the plurality of search areas centering around at least one of the determined candidate points and the number of search points satisfy a merging condition;
   if said at least one of the overlapping degrees and the number of search points satisfy the merging condition in said judging step, merging the corresponding search areas; and
   estimating a motion vector using the merged search areas.

7. The motion vector searching method of claim 6, wherein in the determining step, the candidate points having a small SAD are determined by a full search in the present frame and the previous frame having the lowest resolution.

8. The motion vector searching method of claim 7, wherein the SAD is a sum of absolute differences among the pixel values of the respective search areas of the present frame and the previous frame.

9. The motion vector searching method of claim 6, wherein the estimating a motion vector estimates the motion vector adaptively using the merged search areas and non-merged search areas.

* * * * *